Figure 1:
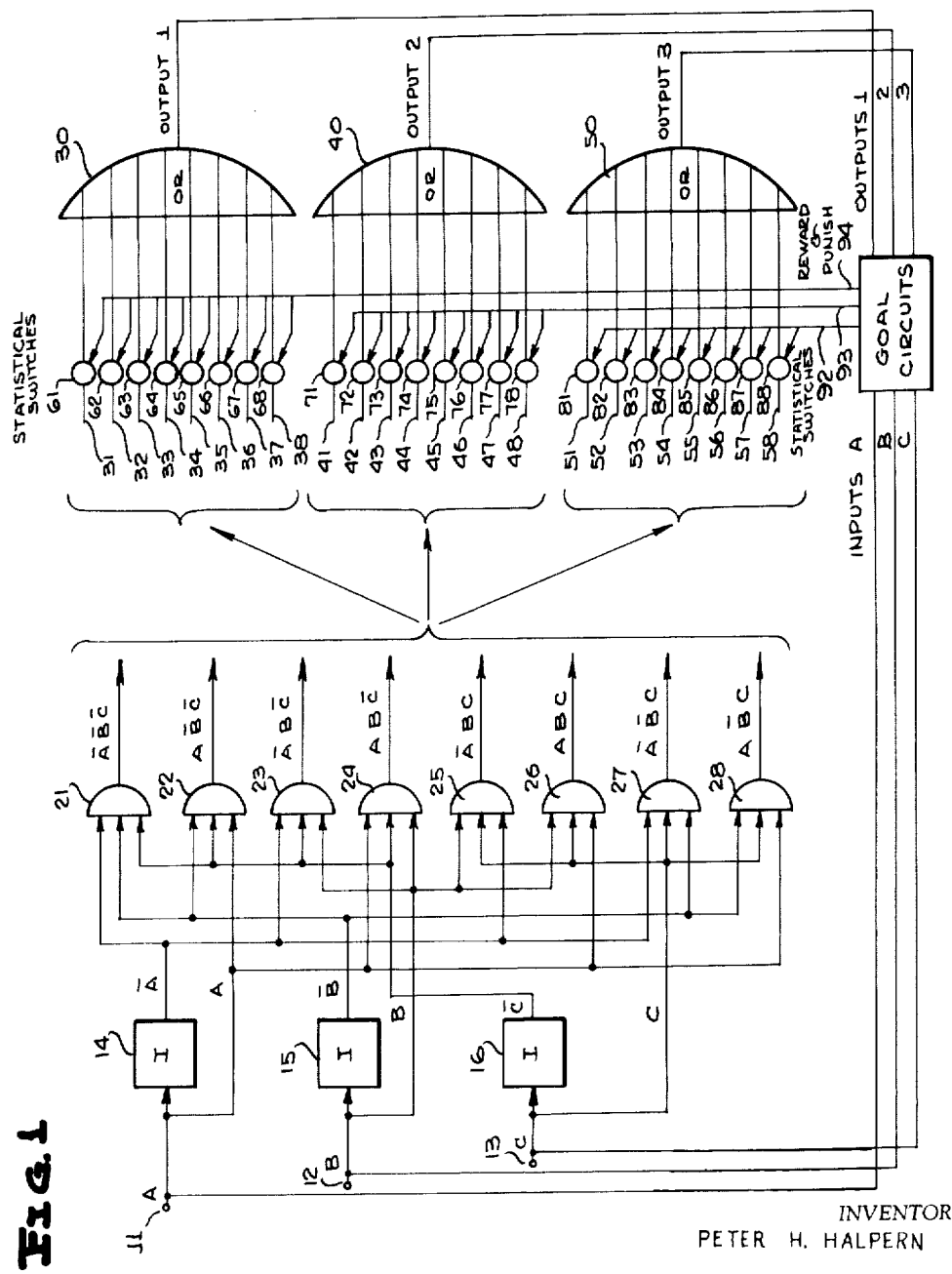

INVENTOR
PETER H. HALPERN

BY Hurvitz and Rose
ATTORNEYS

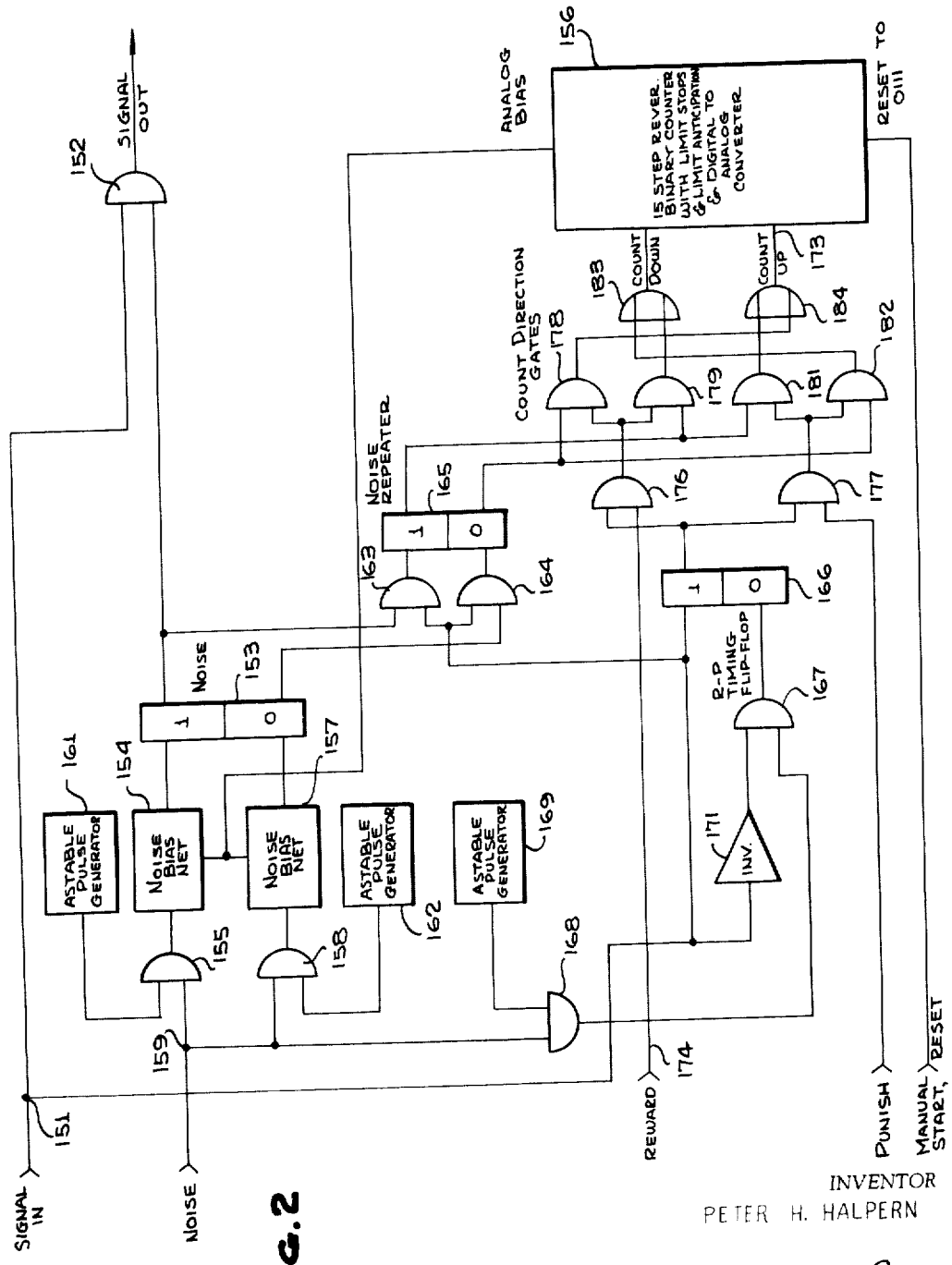

United States Patent Office 3,262,101
Patented July 19, 1966

3,262,101
GENERALIZED SELF-SYNTHESIZER
Peter H. Halpern, Falls Church, Va., assignor to Melpar, Inc., Falls Church, Va., a corporation of Delaware
Filed Jan. 31, 1962, Ser. No. 170,059
6 Claims. (Cl. 340—172.5)

The present invention relates generally to machines capable of self-organization to generate logical functions according to prescribed goals and more particularly to a self synthesizing machine where one or more functions of two or more variables are learned by the machine by generating the canonical products of variables applied to the machine in the form of input signals.

In the application of Robert J. Lee, Serial Number 160,965, filed September 14, 1961 entitled "Self Synthesizing Machines" there is disclosed a system for learning one function of two or more variables. In the application of Lee, a plurality of elements known as "artrons" are interconnected to generate the desired function. Each artron is capable of assuming all sixteen Boolean algebra states of the two input signals applied thereto. The output signal of a first artron element is coupled to the input of a second artron element having another input signal supplied thereto. The output signal of a network composed of a multiplicity of such artrons connected in cascade is compared with the network desired value to generate reward and punish signals. The reward and punish signals are supplied to the artron network and drive each individual artron towards its desired state.

Initially, certain functions were not permitted to be synthesized by the apparatus disclosed in the application of said Lee. The functions which were not generated were selected on an arbitrary basis. It has been found that there is no good reason for selecting only certain functions to be generated initially if no a priori information regarding the desired state of the network is provided. By initially inhibiting certain network states without a priori information, it has been found that the network frequently takes considerably longer to arrive at its final state for many of the functions synthesized.

The present invention is an improvement on Lee's earlier machine since the need for the cascaded artrons is eliminated by simultaneously combining all of the input signals. The combined signals are in the form of the canonical products of the input signals. The canonical products of the input signals are defined as the AND functions of the input signals and their complements. For each binary input signal applied to the network, $2^n$ canonical products are generated. Only one canonical product is "1" at any time.

To synthesize one function, each canonical product is supplied through a separate switch to an OR gate. The OR gate output signal is compared with the desired value of the network and the state of the switches supplying the OR gate is adjusted in response to reward and punish signals generated by the comparison. To synthesize two functions of the input signals, each canonical product is supplied in parallel through two switching circuits to separate OR gates. For $n$ functions, each canonical product is supplied through $n$ switching circuits to $n$ OR gates. The output signals of the OR gates are compared with the desired values for the particular functions to generate reward and punish signals which are supplied to the switches coupling the canonical products signals to each OR gate.

Since the artron elements are cascaded, the prior Lee device frequently requires a considerable number of operations before a function is properly synthesized. This results from the inability of the reward and punish signals to properly drive each artron element towards its ultimate, final state. Instead, it frequently happens that some of the artron switches are initially driven towards the incorrect state. For a complex maze of artrons it is not difficult to see that this results in a very difficult and time consuming process.

In the present invention, machine learning time and hardware are greatly reduced since a maximum of $2^n$ switches are required for each function of $n$ variables synthesized. This is contrary to the Lee device which requires at least $2^n$ switches to synthesize a function of $n$ variables. Moreover, most functions cannot be synthesized with only $2^n$ switches and a purely generalized function requires considerably more. In the apparatus of Lee's application, five artrons are employed to generate a generalized function of three variables. Five artrons require twenty switches. The present invention however requires only eight switches to synthesize the same function of three variables.

To synthesize two functions of three variables, the prior machine requires an exact duplication of the apparatus employed. With the present invention, however, it is only necessary to provide $2^n$ additional statistical switches and an OR gate for each additional function synthesized. Thus, to synthesize two generalized functions of three variables, the prior machine requires forty switches while the present invention requires only sixteen. Since the switch is a relatively complex device as will become apparent hereafter it is desired to minimize them to the utmost.

Accordingly, it is an object of the present invention to provide a new and improved self synthesizing machine.

It is a further object of the present invention to provide a new and improved self synthesizing machine utilizing minimum hardware and capable of self-organization toward a desired goal in a substantially smaller interval of time than is required by prior art machines for learning the same function or functions.

It is an additional object of the present invention to provide a new and improved self synthesizing machine for synthesizing more than one function of a plurality of variables.

It is an additional object of the present invention to provide a new and improved self synthesizing machine wherein all of the input signals are combined thus eliminating the need for cascaded learning elements.

It is still another object to provide a self synthesizing machine wherein the learning elements are at all times driven towards their correct ultimate states.

A further object of the present invention is to provide a self synthesizing system wherein all of the possible functions are capable of being initially synthesized unless a priori information relative to the desired function is available.

It is still a further object of the present invention to provide a new and improved self synthesizing machine wherein the canonical products of the machine input signals are generated and combined together after being supplied through function learning switches.

It is another object of the present invention to provide a self synthesizing machine for two or more input signals capable of generating more than one output function of said input signals wherein hardware is not duplicated.

The above and still further objects, features and advantages of the present invention will become apparent upon consideration of the following detailed description of one specific embodiment thereof, especially when taken in conjunction with the accompanying drawings, wherein:

FIGURE 1 is a block diagram of an exemplary arrangement according to the present invention; and FIGURE 2 is a block diagram of the statistical switch employed in FIGURE 1.

Reference is now made to FIGURE 1 of the accompanying drawings, wherein three binary input signals A, B and C are applied to input terminals 11, 12 and 13, respectively. The input signals on terminals 11, 12 and 13 are supplied through inverters 14, 15 and 16, respectively. The inverters are conventional digital logical circuit components functioning to generate output digits representing the complements of the respective signals applied to terminals 11, 12 and 13. If for example a "0" is applied at terminal 11, a "1" is generated by inverter 14 in response thereto.

Output signals of inverters 14, 15, 16 are applied in groups of three to each of AND gates 21–28 so that the outputs of the several gates constitute the set of non-redundant product (AND) functions of the input variables and their complements taken three at a time. To this end, the A input is applied in parallel to four of the eight AND gates (22, 24, 26, 28); $\bar{A}$ (A inverted) is applied in parallel to the remaining four of the eight AND gates (21, 23, 25, 27); B is applied in parallel to two each of the AND gates to which A and $\bar{A}$ are applied (24, 26, and 23, 25, respectively); $\bar{B}$ is applied in parallel to the remaining two each of the AND gates to which A and $\bar{A}$ are applied (22, 28 and 21, 27, respectively); C is applied in parallel to each of the four AND gates to which non-redundant combinations of A, $\bar{A}$, B, $\bar{B}$ are applied (25–28); and $\bar{C}$ is applied in parallel to the remaining four AND gates to which non-redundant combinations of A, $\bar{A}$, B, and $\bar{B}$ are applied (21–24). Thus, the outputs of AND gates 21–28 are the non-redundant canonical products of the input variables and their respective complements, taken three at a time. Similarly, for four input variables, 16 canonical products are required, and, in general, $n$ input variables would require $2^n$ AND gates with all combinations of the input variables and their respective complements taken $n$ at a time for application to the $2^n$ gates. In FIGURE 1, the canonical products are formed in the order $\bar{A}\bar{B}\bar{C}$, $A\bar{B}\bar{C}$, $\bar{A}B\bar{C}$, $AB\bar{C}$, $\bar{A}BC$, $ABC$, $\bar{A}\bar{B}C$, $A\bar{B}C$, but it is to be noted that the particular order in which the product (AND) functions are formed is immaterial to the essence of the invention.

In the apparatus of FIGURE 1, it is desired to synthesize three independent general functions of the three input variables A, B and C, the independent functions being designated outputs 1, 2, and 3 from OR gates 30, 40, and 50, respectively. Accordingly, the output product function formed by each AND gate 21–28 is supplied in parallel to separate ones of the statistical switches of each of three groups of such switches associated respectively with OR gates 30, 40 and 50. The output signal of AND gate 21, indicative of the Boolean function $\bar{A}\bar{B}\bar{C}$, is supplied to leads 31, 41 and 51. The output signal of AND gate 22 is fed to leads 32, 42 and 52. In a similar manner the output signals of AND gates 23–28 are supplied to leads 34–38, 43–48, and 53–58.

The signals on leads 31–38, 41–48 and 51–58 are fed to separate statistical switches 61–68, 71–78 and 81–88, respectively. Each of the statistical switches 61–68, 71–78 and 81–88 is a variable time period switch which is initially opened and closed for equal time periods. The learning or synthesizing process involves driving the statistical switches toward a completely open or closed state depending upon the desired function to be synthesized.

The output signals of statistical switches 61–68 are coupled to a conventional OR gate 30; the output signals of statistical switches 71–78 are coupled to a further OR gate 40; and the output signals of statistical switches 81–88 are supplied to OR gate 50. The output signals of the OR gates 30, 40 and 50 are supplied in parallel to goal circuit 91 as are the input signals A, B and C.

The goal circuit 91 generates reward and punish signals on leads 92, 93 and 94. While each of leads 92, 93 and 94 is shown as a single lead on the drawing, it is to be understood that it is actually a pair of signal carrying leads, one lead carrying punish signals and the other lead carrying reward signals. The reward or punish signals on lead 92 are supplied in parallel to statistical switches 81–88; the reward and punish signals on lead 93 are coupled in parallel to statistical switches 71–78; while the reward and punish signals on leads 94 are fed in parallel to the statistical switches 61–68.

Goal circuit 91 generates a separate output signal on each of the leads 92, 93 and 94 after a comparison of the output signals of OR gates 30, 40 and 50 is effected with the desired programmed functions of the input signals A, B and C. In simplest form, goal circuit 91 is preprogrammed to generate the desired functions in response to the input signals A, B and C. The preprogrammed signal is retained in a memory within the goal circuit. In response to the A, B and C signals, three separate signals are generated indicative of the desired functions to be synthesized. As an example, the goal circuit 91 may comprise conventional digital logic circuitry adapted to form the $m$ desired independent functions of the three variables, each function then stored in any conventional memory unit. As the logical output functions designated outputs 1, 2 and 3 (FIGURE 1) of OR gates 30, 40 and 50 are generated, each is concurrently compared with the respective preprogrammed function in the memory unit. The comparators respectively associated with the outputs 1, 2 and 3 are adapted to provide the reward and punish signals to the respective groups of statistical switches. Since R (reward) is obviously $\bar{P}$ (not punish) and P (punish) is $\bar{R}$ (not reward), correspondence between any desired output function and the actual output function may be utilized to generate a reward while non-correspondence may be utilized to generate a punish. Any simple conventional comparator, such as a Schmitt trigger circuit, may be used for purposes of comparing the actual logical output function with the desired logical output function stored in the conventional memory unit and of generating the reward and punish signals accordingly. As explained above reward is the negation of punish and vice versa so that a simple inverter may be used to implement the punish signal.

Each of the three generated signals indicative of the desired functions to be synthesized is compared with one of the output signals of OR gates 30, 40 and 50. When the preprogrammed, desired signal in response to the A, B and C input signals is the same as the output signal from OR circuit 30, a reward signal is generated on lead 94. The reward signal drives only the statistical switch or switches having a "1" canconical product signal supplied to it during the previous operation. If the switch was closed during the preceding operation, it is driven towards a state of being closed more often. If the switch was open during the preceding operation, the reward signal also drives it be open more frequently. When there is a disagreement between the output signal of OR gate 30 and the desired value of the function as derived from the memory in response to the A, B and C input signals, a punish signal is generated on lead 94. The punish signal on lead 94 drives that statistical switch having a "1" canonical product signal supplied to it during the preceding operation in exactly the opposite manner from the reward signal.

Similar circuits are provided within goal circuit 91 for the output signals of OR gates 40 and 50 which are combined with the desired values of the input signals A, B and C for the functions to be generated by the switches feeding OR gates 40 and 50. The reward and punish signals from goal circuit 91 in response to the compared value of OR gate 40 with the desired value thereof are supplied to statistical switches 71–78 on leads 93. A comparison between the output signal of OR gate 50 with the desired value of the function in response to the A, B and C signals results in reward and punish signals being generated on leads 92 for statistical switches 81–88.

For more complete understanding of the manner in which the present invention operates, an example of a specific function to be synthesized is given. Let it be assumed that it is desired for the netwrok to synthesize itself to the function $F = ABC + \bar{A}\bar{B}C + A\bar{B}\bar{C} + \bar{A}B\bar{C}$. This function is to be synthesized at the output signal of OR gate 30.

The truth table for the function desired to be synthesized by statistical switches 61–68 and OR gate 30 is given in the following table:

$$F = ABC + \bar{A}\bar{B}C + A\bar{B}\bar{C} + \bar{A}B\bar{C}$$

|   | A | B | C | F |
|---|---|---|---|---|
| 1 | 0 | 0 | 0 | 0 |
| 2 | 0 | 0 | 1 | 1 |
| 3 | 0 | 1 | 0 | 1 |
| 4 | 0 | 1 | 1 | 0 |
| 5 | 1 | 0 | 0 | 1 |
| 6 | 1 | 0 | 1 | 0 |
| 7 | 1 | 1 | 0 | 0 |
| 8 | 1 | 1 | 1 | 1 |

Goal circuit 91 is preprogrammed in accordance with this table so that a memory included therein generates the desired output signals indicative of the function F in response to the A, B and C input signals. The output signal of the memory within the goal circuit 91 is compared with the output signal of OR gate 30 to generate reward and punish signals on the lead 94.

It is assumed for purposes of the present example that the A, B and C input signals on leads 11, 12 and 13 are generated sequentially in accordance with numbers 1–8 of the preceding table. In response to the first sequence of input signals, i.e. A, B and C all being equal to "0," a "1" signal is generated on the output lead of AND gate 21. A "0" signal is generated on the output lead of each of the other AND gates 22–28 in response to the same sequence. Let it be assumed that at the time a "1" is generated on the output lead of AND gate 21 in response to the first sequence that statistical switch 61 is closed. Statistical switch is opened or closed initially 50% of the time so this is a very valid assumption. Since statistical switch 61 is closed and a "1" input signal is applied thereto on lead 31 from AND gate 21, a "1" output signal is generated by OR gate 30. This "1" output signal is compared in goal circuit 91 with the desired value of the first sequence, which is "0." Since the actual and desired signals are different, a punish signal is generated on lead 94 in response to the comparison. The punish signal is effectively applied only to statistical switch 61 since it was the only one having a "1" input signal supplied thereto at the time the first sequence was generated, as will subsequently be explained. The punish signal tends to drive statistical switch 61 in a direction so that it will not be open as much of the time as previously.

Let it now be assumed that the second sequence of the above table is generated so that the A, B and C signals on leads 11, 12 and 13 are 0, 0 and 1, respectively. This results in a "1" being generated on the output lead of AND gate 27. All of the other AND gates 21–26 and 28 have 0's on their output leads in response to this sequence. The "1" signal on the output lead of AND gate 27 is coupled to statistical switch 67 which is now assumed open. Since statistical switch 67 is open and "0's" are applied to all of the other statistical switches 61–66 and 68, a "0" is generated by OR gate 30. This "0" is compared with the desired value, "1," of the function in response to the second sequence in goal circuit 91. In response to the comparison a punish signal is generated on lead 94 which activates only statistical switch 67. None of the other statistical switches 61–66 and 68 is activated in response to this punish signal because "0" input signals were applied to them in response to the previous sequence. The punish signal drives statistical switch 67 in the opposite state to that in which it was upon reception of the canonical product signal responsive to the second signal sequence, that is towards a position of being closed more of the time.

In response to the third sequence of input signals in the above table, where input signals A, B and C are of values "0," "1" and "0," respectively, a "1" output signal is generated by AND gate 23. "0" output signals are generated by the other AND gates 21, 22 and 24–28 in response to the third sequence and consequently a "1" input signal is applied only to statistical switch 63 in response to the third sequence. It will be assumed that statistical switch 63 is in a closed state at the time the "1" signal is applied thereto on lead 33. Accordingly, a "1" signal is generated by OR gate 30 which is compared in goal circuit 91 with the desired value, "1," for the third sequence. This results in a reward signal being gennerated on lead 94. The reward signal activates only statistical switch 63 and has no effect on statistical switches 61, 62 and 64–68, since these other statistical switches have "0" input signals applied thereto in response to the third sequence. Since statistical switch 63 was closed in response to the third sequence the reward signal has a tendency to drive this switch towards a closed state.

From the manner specifically illustrated for sequences 1, 2 and 3 it should now be apparent that the remaining statistical switches are ultimately driven to their correct states for the desired function to be synthesized without being purposely driven toward the incorrect state. Since there is a possibility of occasional malfunction in the system feeding the statistical switches, they may sometimes be driven towards the incorrect states. Accordingly, the statistical switches are provided with a plurality of intermediate states between the median and completely open and closed states. Upon receipt of a sufficient number of reward and punish, each statistical switch is finally driven to a completely open or closed state, whereupon its learning process is complete for the problem of interest. In a similar manner, the desired function of the second system including statistical switches 41–48 and OR gate 40 is synthesized and the desired function of the third system including statistical switches 81–88 and OR gate 50 is synthesized.

Reference is now made to FIGURE 2 of the drawings which discloses a particular embodiment of the statistical switches employed in the present invention. The input signal of each statistical switch, derived from its respective AND gate, 21–28, 31–38, or 41–48 is applied to terminal 151 and AND gate 152, the output lead of which serves as the switch output lead and is applied to its respective OR gate 30, 40 or 50. AND gate 152 passes "1" signals on terminals 151 when noise flip-flop 153 is in its "1" state, as determined by the condition of noise bias network 154. Noise bias network 154, which determines whether the switch is open or closed, is supplied with variable amplitude, input spikes from AND gate 155 and a biasing voltage from counter-converter 156. Counter-converter 156 is a conventional 15 stage binary, reversible counter with weighting resistors connected in the output circuit of each stage to generate a variable amplitude analog voltage indicative of the counter state. The "0" state of flip-flop 153 is supplied with input pulses from noise bias network 157 which is connected to the output of counter-converter 156 and the output lead of AND gate 158.

As the analog voltage output of counter-converter 156 varies from a central value between upper and lower fixed limits, the bias networks 154 and 157 are varied. When the analog output voltage of counter-converter 156 is of low value, bias network 154 is adapted to pass low amplitude signals from AND gate 155 and the statistical switch is closed most of the time to pass the signal at terminal 151. At the same time, noise bias network 157 passes only high amplitude signals from AND gate 158. When a large analog voltage is generated by counter-converter 156, biasing networks 154 and 157 are oppositely controlled. When the median value of counter-converter 156 is generated, biasing networks 154 and 157 are set to pass the same amplitude signals.

AND gates 155 and 158 are supplied with variable amplitude, low frequency noise signals from a noise source connected to terminal 159 and are respectively responsive to astable pulse generators 161 and 162. Pulse generators 161 and 162 have constant equal pulse repetition rates but are displaced in phase so that noise bias networks 154 and 157 are supplied with an equal number of variable amplitude pulses at the times "1" input signals are generated at terminal 151. When each of the pulse generators 161 and 162 generates an output pulse, the noise signal on terminal 159 is gated to the respective biasing network 154 and 157. Generally the pulses of generators 161 and 162 occur at different times (i.e., are displaced in phase relative to one another) to prevent simultaneous actuation of both the "1" and "0" states of flip-flop 153.

The output signals of the "1" and "0" states of flip-flop 153 are supplied to AND gates 163 and 164, respectively. The other input terminals of AND gates 163 and 164 are responsive to the input signal on terminal 151. The output signals of AND gates 163 and 164 are respectively connected to the "1" and "0" states of noise repeater flip-flop 165. Noise repeater flip-flop 165 stores the state of the noise flip-flop 153 after termination of the signal on terminal 151. This is necessary because the signals passed by noise bias networks 154 and 157 are capable of changing between termination of the signal on lead 151 and application of the reward and punish signals from goal circuit 91.

To erase the signal applied to the switch prior to the occurrence of the next signal but subsequent to the generation of the reward and punish signals, flip-flop 166 is provided. The "1" state of flip-flop 166 is directly supplied with the input signal on terminal 151 while the "0" state thereof is actuated by AND gate 167. One of the input signals coupled to AND gate 167 is supplied from AND gate 168 which is responsive to astable pulse generator 169 and the noise signal on terminal 159. The other input terminal of AND gate 167 is supplied by an inverter 171, responsive to the input signal on terminal 151.

When a "1" input signal is generated at terminal 151, flip-flop 166 is set to its "1" state in response thereto. Flip-flop 66 remains in this state at least until the signal on terminal 151 has terminated. This is insured by inverter 171 which inhibits AND gate 167 until the signal on terminal 151 is "0." Gate 167 is actuated at a statistically random time after the "1" signal on terminal 151 terminates. This is accomplished with astable pulse generator 69 which gates the noise signal through AND gate 168 to AND gate 167. When the noise signal amplitude is sufficiently great to permit AND gate 168 to open when a pulse is derived from generator 169, AND gate 167 actuates the "0" state of flip-flop 166 until the next "1" is generated at terminal 151.

Signals on leads 172 and 173 determine whether counter-converter 156 is to be driven in an upward or downward direction. When a pulse is produced on lead 173, counter-converter 156 is driven in an upward direction, causing bias network 154 to block lower amplitude signals than previously and bias network 157 to pass lower amplitude signals. In an opposite manner, an input signal on lead 172 drives counter-converter 156 in a negative direction to reverse the tendency of networks 154 and 157 to pass high and low amplitude signals.

Generation of counting pulses on leads 172 and 173 is accomplished in response to reward and punish signals on leads 174 and 175 and the output signals of flip-flops 165 and 166. The reward lead 174 is connected to one input termianl of AND gates 176 while the punish lead 175 is connected to one input terminal of AND gate 177. The reward and punish leads 174 and 175 together correspond to one of the leads 92–94. The other input terminals of the AND gates 176 and 177 are simultaneously responsive to the "1" state of flip-flop 166. Flip-flop 166 is maintained in the "1" state by astable generator 169 for a sufficient period of time subsequent to termination of a "1" signal on terminal 151 to permit gating of the reward and punish signals on leads 174 and 175 through AND gates 176 and 177. If a "0" signal is applied to terminal 151, flip-flop 166 remains in the "0" state and the reward and punish signals have no effect on counter-converter 156 and consequently no effect on the switch. The output signal of AND gate 176 is applied to AND gates 178 and 179 while the output signal of AND gate 177 is simultaneously applied to AND gates 181 and 182. The output of only one of the gates 176 and 177 will, of course, be "1" at any given instant of time.

The "1" state output signal of flip-flop 165, indicative of network 154 passing signals and the statistical switch being closed at the time a "1" input signal is applied to terminal 151, is coupled as the other input signals to AND gates 179 and 181. The output signal of the "0" state of flip-flop 165, indicative of the same condition for noise bias network 157 but of the statistical switch being closed when a "1" is generated at terminal 151, is supplied simultaneously to the other input terminals of AND gates 178 and 182. OR gate 183 is responsive to the output signals of AND gates 179 and 182 while OR gate 184 is responsive to the output signals of AND gates 178 and 181.

Counter-converter 156 is of the well known reversible type and is reset to its center position in response to an input signal on lead 185. In a preferred embodiment of the present invention, counter-converter 156 contains 15 stages, 0–14, having a median count of 7.

OR gates 183 and 184 generate signals on leads 172 and 173 for decreasing and increasing the count of counter-converter 156. If the noise at terminal 159 is of sufficient amplitude to be passed through the bias established by counter-converter 156 on network 154 when a pulse is generated by generator 161, flip-flop 153 assumes the "1" state. With flip-flop 153 set in the "1" state, a "1" input signal on terminal 151 sets flip-flop 165 to the "1" state. With flip-flop 153 set to the "0" state, in response to the noise amplitude in bias network 157, a "0" is set in flip-flop 165 when a "1" signal is generated at terminal 151.

As reward and punish signals are applied to leads 174 and 175, the bias levels of networks 154 and 157 and consequently the periods of times flip-flops 153 and 165 are set in the "1" or "0" state are varied. The combination of flip-flop 165 being in the "1" state and a reward signal being generated on lead 174 results in an input signal being supplied to both input terminals of AND gate 179. Both input terminals of AND gates 178, 181 and 182 do not receive input signals under these conditions. Consequently, an output signal is generated by AND gate 179 and output signals are not generated by AND gates 178, 181 and 182.

The signal generated by AND gate 179 is supplied through OR gate 183 to the count down lead 172 of counter-converter 156 to drive the counter-converter 156 towards a setting where network 154 passes more of the variable amplitudes signals from AND gate 155 and network 157 passes fewer of the variable amplitude signals from AND gate 158. If, however, noise repeater flip-flop 165 is set in a "1" state at the time a punish signal is generated on lead 75, only AND gate 181 is actuatable and gates 178, 179 and 182 remain unactuated. Actuation of AND gate 181 results in a signal being supplied through OR gate 184 to increase the analog voltage generated by counter-converter 156. The increased voltage of counter-converter 156 causes network 154 to pass only higher amplitude signals from AND gate 155 and network 157 to pass lower amplitude signals from AND gate 158. In a similar manner, OR gates 183 and 184 are responsive to the output signals of AND gates 178 and 182 and flip-flop 165 is set in a "0" state as a result of the statistical switch being closed when a "1" is generated at terminal 151.

The amplitude of noise source 159 is limited to a value between the signals generated by the thirteenth and fourteenth states of counter-converter 156. This is necessary to maintain noise bias network 154 at a level to insure noise flip-flop 153 remaining in the "0" state when counter-converter 156 is driven to its highest value. Otherwise, noise flip-flop 153 could be actuated in its "1" state even though counter-converter 156 is driven towards its highest state, indicative of the statistical switch being open. Of course the noise signal must have a certain minimum value to maintain noise flip-flop 153 in its "1" state when the voltage generated by counter-converter 156 is a minimum.

To destroy the learning process of the statistical switch it is merely necessary to reset counter-converter 156 to its median value. This is accomplished in a well-known manner by supplying a clearing pulse on lead 185 to counter-converter 156. When the counter-converter is reset to its median value, any learning accomplished by the switch is erased.

Of course it is to be understood the machine of the present invention can be designed to synthesize any number of functions of any number of variables and it is not limited to three functions of three variables. To teach the machine to generate $m$ functions of $n$ variables, it is necessary to provide $m2^n$ statistical switches. The goal circuit employed will not usually be of the simple type described in the present application but will be responsive to stimuli from the environment in which it is desired for the machine to function. It is not necessary to provide circuits for generating each of the canonical products of the input signals if it is desired and proper to approximate the synthesized function or if a priori information relative to the synthesized function is available.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus adaptive to form $m$ selected logical functions of $n$ binary input variables, where $m$ and $n$ are integers greater than one, comprising, in combination:

a maximum of $m$ groups of $2^n$ statistical switch elements, each group associated with the formation of a separate one of said $m$ logical functions, each switch element having a plurality of possible operating states corresponding to respective distinct and different levels of probability of being open or closed during any given interval of time, whereby the probability that input logic applied into any switch element will be supplied as output logic therefrom corresponds to the level of probability set by the operating state of that switch element during the interval of application of said input logic;

means responsive to said input variables for generating non-redundant functions thereof as input logic to selected ones of the switch elements of each group;

$m$ means, each associated with a respective separate one of said groups of switch elements, for performing arithmetic operations on the output logic supplied by its associated group of switch elements to provide $m$ logical output functions of said output logic;

means for identifying a correspondence or a lack of correspondence between each of said $m$ selected logical functions and respective ones of said $m$ logical output functions and for generating training signals indicative of said correspondence or lack of correspondence, and means for applying said training signals to said switch elements to control the states thereof and thereby to enhance the probability that the output logic supplied by said switch elements to said means for performing arithmetic operations will result in the generation of said $m$ selected logical functions as outputs therefrom.

2. The combination according to claim 1 wherein said means for generating non-redundant functions comprises means for generating the respective complements of said input variables;

and $2^n$ AND gates, each responsive to the application of a distinct one of the non-redundant combinations of said input variables and their complements taken $n$ at a time for supplying the logical product function thereof as said input logic to a respective one of the switch elements of each of said groups.

3. The combination according to claim 2 wherein said means for identifying comprises goal circuitry adapted to respond to said $n$ input variables to form said $m$ selected logical functions and to compare the selected functions with the functions generated by said means for performing arithmetic operations.

4. The combination according to claim 3 wherein said $m$ means for performing arithmetic operations comprises $m$ OR gates, each for producing the logical sum function of the output logic supplied by its associated group of switch elements.

5. An adaptive binary logical network comprising $n$ input terminals and $m$ output terminals, where $m$ and $n$ are integers greater than one;

$n$ inverters, each connected to a separate one of the $n$ input terminals, for converting bits applied thereto to respective complementary bits;

$2^n$ AND gates, each responsive to the application of a separate set of the $2^n$ non-redundant sets of said bits and their complements taken $n$ at a time for producing the respective product functions thereof;

$m$ groups of statistical switches, each group having $2^n$ switches;

means for applying the product functions produced by said $2^n$ AND gates in parallel to each group of switches so that a distinct and different product function is applied to each switch of a group;

$m$ OR gates, each connected to receive the product functions passed by the statistical switches of a separate one of said groups of switches and to supply a sum function to a separate one of said $m$ output terminals; and means for generating training signals for application to said switches to limit the product functions passed by said switches to those which will form sum functions, at each of said output terminals, corresponding to preselected sum functions of said bits and their complements.

6. In a self-synthesizing machine adapted to provide $m$ binary logical output signal functions from any combination of binary values of $n$ binary input signal variables, where $m$ and $n$ are integers greater than one, means for developing the canonical products of all combinations of said binary input signal variables taken $n$ at a time;

$m$ groups of $2^n$ statistical switches, each switch capable of assuming any one of a plurality of states of being open or closed during any given interval of time, each state corresponding to a distinct and different percentage of time that the switch is opened or closed during the time interval;

means for supplying said canonical products in parallel to said groups of switches so that each switch of a group is supplied with a different canonical product;

means for summing the canonical products passed by the switches of each group of switches to form $m$ separate sums as said $m$ binary logical output signal functions; and means for controlling the state of each statistical switch whereby to control the canonical products supplied to said means for summing.

(References on following page)

References Cited by the Examiner

Pages 31–33, Sept. 13, 1961, Corneretto, "Bionics Efforts Center on Learning Machines," Electronic Design.

Pages 38–54, Sept. 14, 1960, Corneretto, "Electronics Learns from Biology," Electronic Design.

Pages 222–226, 1956, Keister et al., Design of Switching Circuits, D. Van Nostrand Co.

Pages 83–86, 1958, Culbertson, "Mathematics and Logic for Digital Devices," D. Van Nostrand.

ROBERT C. BAILEY, *Primary Examiner.*

MALCOLM A. MORRISON, *Examiner.*

P. J. HENON, W. M. BECKER, *Assistant Examiners.*